UNITED STATES PATENT OFFICE.

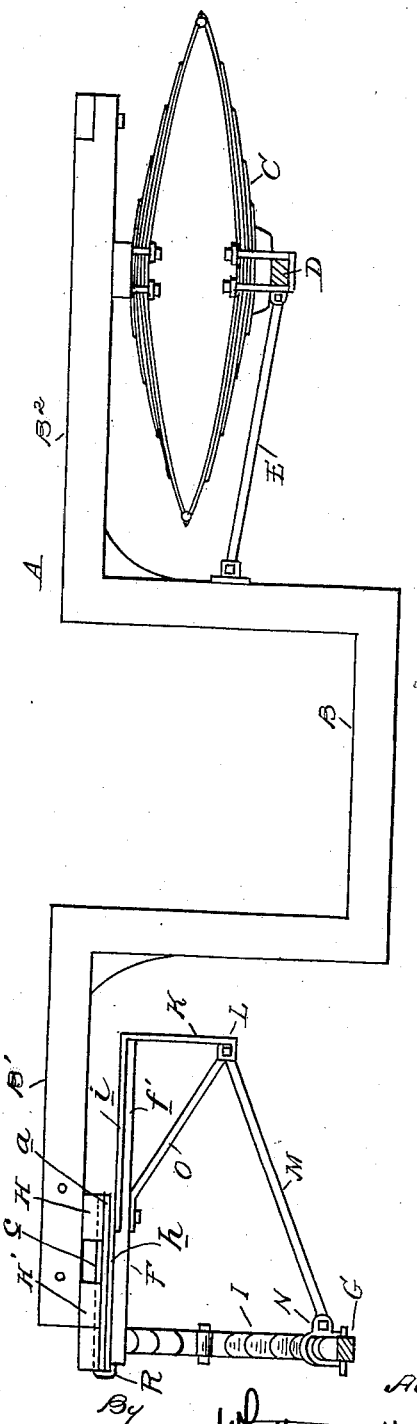

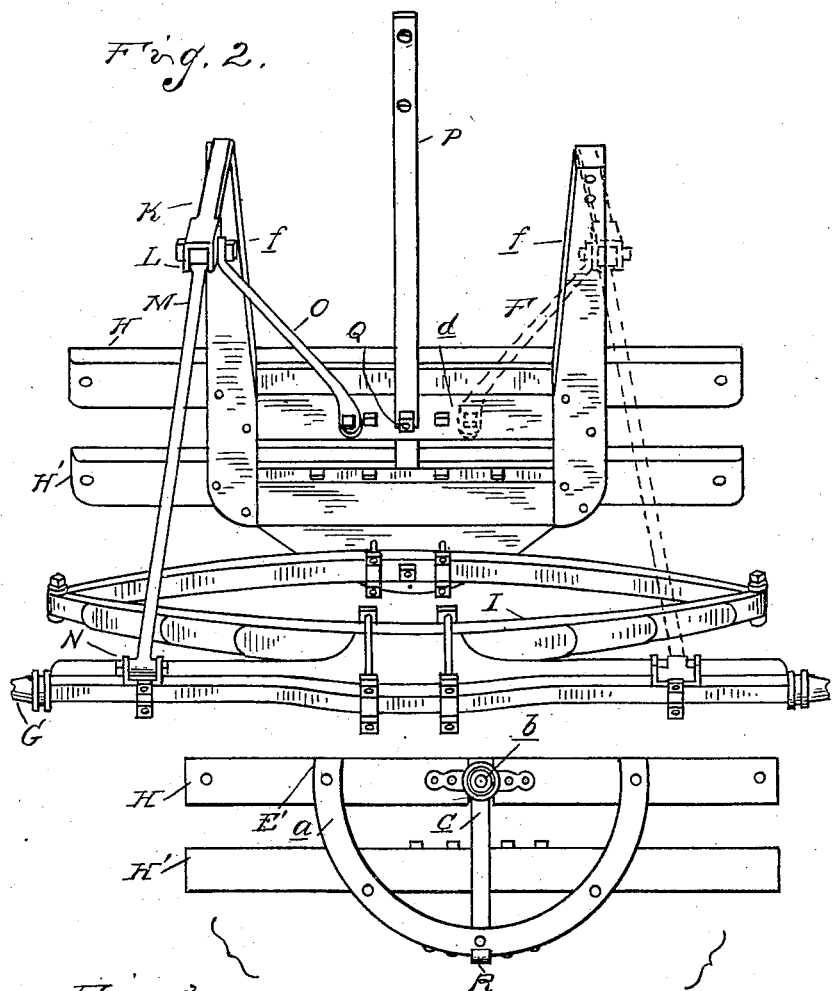

AARON P. BOWMAN, OF PONTIAC, MICHIGAN.

DROP-BODY VEHICLE.

No. 863,585.

Specification of Letters Patent.

Patented Aug. 20, 1907.

Application filed September 22, 1906. Serial No. 335,747.

*To all whom it may concern:*

Be it known that I, AARON P. BOWMAN, a subject of the King of Great Britain and Ireland, residing at Pontiac, in the county of Oakland and State of Michigan, have invented certain new and useful Improvements in Drop-Body Vehicles, of which the following is a specification, reference being had therein to the accompanying drawings.

The invention relates to vehicles of that type known as "drop body", and which is characterized by the construction of frame in which the central portion is dropped below the level of the axles.

The present invention relates more particularly to the construction of circle plate or fifth wheel, and the means by which the front axle is braced, as hereinafter set forth.

In the drawings, Figure 1 is a side elevation of the vehicle frame; Fig. 2 is a perspective view of the front axle and circle plate detached, looking from the under side; and Fig. 3 is a plan view of the stationary and movable members of the circle detached.

A is the frame which is provided with a central drop portion B connected and suitably braced to the front and rear floor portions B′ and B².

C is a spring for supporting the rear portion B² of the frame upon the rear axle D, and E are pivotal links, for bracing said axle, extending between the same to the drop portion of the frame.

The fifth wheel, or circle plate, comprises the stationary member E′, which is secured to the frame, and the rotary member F connected to the spring I carried by the front axle G. The member E′ is preferably secured to the bottom of the cross bars H and H′ constituting a portion of the frame A. It preferably consists of the segment $a$, the central bearing $b$ apertured for the king bolt, and the longitudinally extending brace $c$. The member F is preferably formed of a frame having cross bars $d$ and $e$ and rearwardly extending side bars $f$ and $f'$.

$g$ is a bearing secured to the under side of the bar $d$ for coöperating with the bearing $b$ through which the king bolt passes, and $h$ is a segment secured to the frame for engaging with the segment $a$.

I is a spring clipped to the frame and to the axle G. It is an object of the construction to firmly brace the front axle while permitting perfect freedom of movement with the member F of the circle. For this purpose the rearward extensions $f$ and $f'$ of the frame F are provided with downwardly extending brackets K at their rear ends. These are preferably formed of metal bars $i$ which extend from the ends of the segment $h$ along the upper side of the extensions $f$ and $f'$ and are then bent downward.

L are ears formed at the lower ends of the brackets K for embracing the ends of the rods M pivoted therein. These rods M extend to the axle G, and are pivotally secured to the eared brackets N clipped to said axle. The rods M are also preferably angled opposite to each other so that their ends connected to the axle are spread at greater distance apart than the ends connected to the brackets K.

O are brace rods for the brackets K, which are preferably secured to the pivot pins for the rods M, and are angled oppositely inward to their point of attachment to the frame F, this being preferably to the under side of the cross bar $d$.

P is a brace bar secured to the lower end of the king bolt Q, and extending upwardly to the frame A to which it is secured.

R is a hook formed on the member E′, preferably by the bent end of the bar $c$ which engages the segment $h$ and holds the same to the segment $a$.

In the construction above described, the axle G is held fixed in the plane of the spring I, but is free to swing with said spring about the king bolt, and also permits said spring to flex. This bracing of the axle is due to the two pivotal links M, which are separated from each other, and also angled outward from their points of pivoting to the brackets K to the axle. The dropping of the bracket K places the pivotal point for each rod M slightly above the horizontal plane of the axle, and where the deflection due to the vertical movement of the spring is very slight. Furthermore, the braces O, in connection with the brackets K, form a rigid connection for transmitting the stresses from the rods M to the frame F.

What I claim as my invention is:

1. The combination with the circle plate or fifth wheel, the axle, and an interposed spring, of a pair of separated brace bars pivotally connected at one end to said axle and connections between their opposite ends and said circle.

2. The combination with a circle plate or fifth wheel, the axle, and an interposed spring, of a pair of depending brackets upon said circle and separated brace bars extending between said brackets and said axle and pivotally connected thereto.

3. The combination of a circle plate comprising a frame having a segmental bearing thereon and rearwardly extending arms, of a depending bracket secured to each of said arms, an axle spring between said axle and circle plate, and separated brace links pivotally connected at their opposite ends respectively to said brackets and the axle.

4. The combination of a circle plate comprising the frame F having the segment $h$ and rearwardly extending arms $f$ and $f'$, the brackets K depending from said arms $f$ and $f'$, the brace rods O between said brackets and frame and the brace rods M pivotally connected to said frame and extending to the axle.

In testimony whereof I affix my signature in presence of two witnesses.

AARON P. BOWMAN.

Witnesses:
 FLOYD B. BABCOCK,
 J. L. LIBBY.